United States Patent
Kumar et al.

(10) Patent No.: US 12,382,301 B2
(45) Date of Patent: Aug. 5, 2025

(54) INTRA-OPERATOR TERRESTRIAL SPECTRUM SHARING IN COMMUNICATION NETWORKS

(71) Applicant: T-Mobile Innovations LLC, Overland Park, KS (US)

(72) Inventors: Dinesh Arcot Kumar, Sammamish, WA (US); Anokhi Shah, Bellevue, WA (US); Scott Francis Migaldi, Cary, IL (US); George Frantz Cummings, III, Gilbert, AZ (US); John Joseph Humbert, IV, Roeland Park, KS (US); William Martin Shvodian, McLean, VA (US); David Charles Jones, Bellevue, WA (US); Pascale Dumit, Alexandria, VA (US)

(73) Assignee: T-Mobile Innovations LLC, Overland Park, KS (US)

(*) Notice: Subject to any disclaimer, the term of this patent is extended or adjusted under 35 U.S.C. 154(b) by 464 days.

(21) Appl. No.: 17/889,036

(22) Filed: Aug. 16, 2022

(65) Prior Publication Data
US 2024/0064525 A1    Feb. 22, 2024

(51) Int. Cl.
*H04W 72/04* (2023.01)
*H04W 16/14* (2009.01)
*H04W 72/0453* (2023.01)

(52) U.S. Cl.
CPC ....... *H04W 16/14* (2013.01); *H04W 72/0453* (2013.01)

(58) Field of Classification Search
CPC .............................. H04W 16/14; H04W 72/04
See application file for complete search history.

(56) References Cited

U.S. PATENT DOCUMENTS

2022/0070845 A1* 3/2022 Stauffer ............... H04B 7/0697
2024/0040389 A1* 2/2024 Hosseini ............... H04W 16/14

* cited by examiner

*Primary Examiner* — Michael T Vu
(74) *Attorney, Agent, or Firm* — SHOOK, HARDY & BACON L.L.P.

(57) ABSTRACT

Systems, methods, and computer-readable media herein provide for adjustment of a spectrum sharing allocation between devices operating on 5G and/or 6G technologies. An inter-operator scheduler receives common signals associated with 5G and/or 6G devices and determines time and/or frequency divisions and configurations to a shared technology spectrum to allocate spectrum resources. In response to determining an allocation of the shared spectrum, the shared spectrum can be efficiently shared among 5G and 6G devices in a dynamic and flexible manner.

19 Claims, 7 Drawing Sheets

INTRA-OPERATOR TERRESTRIAL SPECTRUM SHARING IN COMMUNICATION NETWORKS

BACKGROUND

Communication networks operate according to one or more technical specifications that define the operations, procedures, parameters, component, and/or any other aspect that enables connectivity and communication with the devices that operate on the communication network. In telecommunication networks, developing a new technical standard, such as 4G LTE and 5G NR, often takes a significant amount of time and effort for a standards organization to discuss, approve, and formalize. Because of the scope of the various aspects defined in a technical standard, a standard may be developed while a previous version or variant of a standard is deployed. As a new technical standard is deployed over time, networks may operate at the previous standard, the new standard, or multiple standards simultaneously.

Since a multiple standards may operate simultaneously across a communication network. It is advantageous to develop new technical standards in such a way that enables the gradual transition from the previous standards to the new standard—which may take place over a period of several years—in such a way that allows for efficient use of the wireless communication spectrum and provides a wireless service provider to effectively manage user devices that may be utilizing both technical standards simultaneous by balancing bandwidth allotments for the devices without disruption to the network or cause disruption to the service.

In some conventional systems, newly developed technical standards or specifications have included aspects that presented incompatibilities with previous technologies. In these conventional systems, the new technologies were designed around limitations of the previous technologies in ways that were cumbersome and inefficient. For example, 5G NR is designed to accommodate the fixed subcarrier spacing and reference signals that were at a fixed frequency and time slot in the 4G LTE standard. Thus, efficient spectrum sharing required the same sub-carrier spacing for both 4G LTE and 5G NR and resulted in less efficient use of spectrum resources.

SUMMARY

The present disclosure is directed, in part, to intra-operator terrestrial spectrum sharing in communication networks, substantially as shown in and/or described in connection with at least one of the figures, and as set forth more completely in the claims. In contrast to conventional approaches, a communication service provider may provide spectrum sharing operations that allow the provider to serve users (e.g., users of UE devices operating on a network) between one or more communication technologies (e.g., between 5G and 6G technologies) in a shared spectrum space. For example, a service provider may dynamically serve users that are using 5G technologies and/or 6G technologies while using a common spectrum and common control signals and/or measurements. As the relative 5G and 6G composition of traffic operating on the shared spectrum changes, the resource allocation of the spectrum can be adjusted to accommodate the 5G and 6G technologies evolving use. In some embodiments, an inter-operator scheduler may receive information corresponding to 5G and 6G carriers and allocate spectrum resources in response to the received information. For example, an inter-operator scheduler may access radio resource control ("RRC") signals and/or other measurements and reports to determine an allocation or sharing of spectrum resources in the time and/or frequency domain according to any of a number of multiplexing configurations and/or subcarrier spacing configurations (e.g., 15 kHz, 30 kHz, etc.). By relying on common signals associated with the 5G and 6G technologies to schedule and configure network resources, a common communication spectrum may be efficiently and dynamically shared across different frequency ranges and duplexing modes.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention.

The following is a list of these acronyms:
AWS Advanced Wireless Services
BRS Broadband Radio Service
BTS Base Transceiver Station
CDMA Code Division Multiple Access
CSI-RS Channel State Information Reference Signal
DMRS Demodulation Reference Signal
EBS Educational Broadband Services
eNodeB Evolved Node B
EVDO Evolution-Data Optimized
FDD Frequency Division Duplex
gNodeB Next Generation Node B
GPS Global Positioning System
GSM Global System for Mobile Communications
HRPD High Rate Packet Data
eHRPD Enhanced High Rate Packet Data
IoT Internet of Things
LTE Long Term Evolution
LTE-A Long Term Evolution Advanced
MIMO Multiple-Input, Multiple-Output
NR New Radio
PCS Broadband Personal Communications Service
PT-RS Phase Tracking Reference Signal
RSRP Reference Transmission Receive Power
RSRQ Reference Transmission Receive Quality
RSSI Received Transmission Strength Indicator
SDL Supplemental Downlink
SINR Signal-to-Interference-Plus-Noise Ratio
SNR Signal-to-Noise Ratio
SULL Supplemental Uplink
SRS Sounding Reference Signal
TDD Time Division Duplex
WCS Wireless Communications Service
WiMAX Worldwide Interoperability for Microwave Access Further, various technical terms are used throughout this description. A definition of such terms can be found in, for example, Newton's Telecom Dictionary by H. Newton, 31st Edition (2018). These definitions are intended to provide a clearer understanding of the ideas disclosed herein but are not intended to limit the scope of the present invention. The definitions and terms should be interpreted broadly and liberally to the extent allowed by the meaning of the words offered in the above-cited reference.

Embodiments of the technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media includes volatile and/or non-volatile media, removable and non-removable media, and contemplate media readable by a database, a switch, and various other network devices. Network switches, routers, and related components are conventional in nature, as are means of communicating with the same. By way of example and not limitation, computer-readable media comprise computer storage media and/or communications media. Computer storage media, or machine-readable media, include media implemented in any method or technology for storing information. Examples of stored information include computer-useable instructions, data structures, program modules, and other data representations. Computer storage media include RAM, ROM, EEPROM, flash memory or other memory technology, CD-ROM, digital versatile discs (DVDs), holographic media or other optical disc storage, magnetic cassettes, magnetic tape, magnetic disc storage, and/or other magnetic storage devices. These memory components can store data momentarily, temporarily, or permanently. Computer storage media does not encompass a transitory signal, in embodiments of the present invention.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

At a high level, systems, methods, and computer-readable media of the present disclosure provide for uplink transmission power adjustment in 5G NR communication networks. The systems, methods, and computer-readable media disclosed herein may provide a predictive and/or reactive adjustment of transmit power of a UE (e.g., user device) or other device. By detecting changes in signal quality and/or service mode, the effective power used to transmit uplink communications may be adjusted to maintain a target output transmit power and/or other power class parameters. Adjusting the uplink transmit power of a UE in response to changes in signal quality or service mode, allows a UE to operate with an optimal configuration for a particular scenario and/or conditions while minimizing loss in service and/or throughput.

In a first aspect of the present invention, a method is provided. The method comprises receiving information associated with a first device that uses a 5G technology. For example, information may be received from a device via radio resource control ("RRC') signals, reference signals such as CSI-RS signals, or any other signal and/or measurement. The method may comprise receiving information from a second device that is operating as a 6G device. Similarly, in some examples, the 6G device may transmit RRC, or other signals comprising information associated with the device. The method may include determining, based on receiving the information from the first device and the second device, a spectrum allocation configuration that allocates one or more spectrum resources between the first and the second device. For example, the information received from any number of devices may be analyzed to determine a spectrum allocation that assigns particular spectrum frequencies, time slots, priorities, or any resource associated with the shared spectrum. For example, a spectrum allocation may define a load balancing of spectrum resources based on information received in association with a number of devices, using the information to compute time and/or frequency divisions of the spectrum to allocate for each device. The method may further include, adjusting a time or frequency division of a shared spectrum associated with the first devise and the second device based on the determined spectrum allocation configuration. For example, the devices may be assigned to particular time or frequencies in the shared spectrum based on determining a spectrum allocation configuration.

In a second aspect of the present invention, a system is provided. The system comprises one or more processors and one or more computer storage hardware devices storing computer-usable instructions that, when used by the one or more processors, cause the one or more processors to receive information associated with a first device of a communication network. For example, the information may comprise one or more signals correspond to a user device operating on a wireless communication network. In some embodiments, the information may include radio resource control ("RRC") signals, reference signals such as CSI-RS signals, or any other signal and/or measurement signals associated with one or more user devices. The processors of the system may also receive information associated with a second devices of the communication network. For example, signals associated with a second device may be received by the same system as with the first device. In some embodiments the same type of signals may be received in association with the first and second devices, while in at least one embodiment distinct types of signals may be received in association with the first and second devices. In some embodiments, the information received from the first and/or second devices may comprise a Quality of Service ("QoS") level or value. The system may be configured to determine a spectrum allocation configuration that allocates one or more spectrum resources between the first and second devices. For example, based at least on the information received in association with the first device and the information received in association with the second device, particular frequencies or time slots (e.g., time reservations) may be assigned in relation to a particular device. As an example, if the information received in association with the second device indicates a higher QoS than that of the first device, the second device may be given priority when determining a spectrum allocation configuration. In some embodiments, the system may be further configured to transmit, based on the spectrum allocation configuration, to the first device or the second device, an indication of a time or a frequency division of a shared spectrum associated with the first device and the second device. For example, upon determining a spectrum allocation configuration, the system may transmit information to one or more devices that informs the devices of a time and/or frequency division of the shared spectrum. For example, the shared spectrum may be divided in the time domain or the frequency domain such that particular time slots and/or frequencies are assigned to particular user devices. In some embodiments, the devices, upon receiving the indication of the time and/or frequency divisions, may adjust their operations (e.g., communication settings and parameters) in accordance with the divisions.

In a third aspect of the present invention, a computer-readable media is provided, the computer-readable media having computer-executable instructions embodied thereon that, when executed, perform a method for adjusting a time or frequency division of a shared spectrum. In accordance with the media, the method may comprise receiving resource control information associated with a first device using a 5G technology. For example, RRC signals associated with a 5G device may be received. In some embodiments, the method may comprised receiving resource control information associated with a second device using a 6G technology. For instance, RRC signals associated with a device operating on a 6G technology may be received. In at least one embodiment, a spectrum allocation configuration can be determined which allocated one or more spectrum resources between the at least the first device and the second device. For instance, a spectrum allocation configuration may be determined which allocates particular frequencies and/or time blocks of a shared spectrum to any number of devices that communicate using the shared spectrum. In some embodiments, determining the spectrum allocation configuration may be based at least on information received in association to a 5G device and/or the information received in association with a 6G device. In at least one embodiment, based on determining a spectrum allocation configuration, a time and/or frequency division of a shared spectrum associated with the first device and the second device may be determined. As an example, based on the received resource control information and the spectrum allocation configuration, allocation of network resources in a time domain and/or a frequency domain may be adjusted in accordance with the spectrum allocation configuration.

Figure 1:
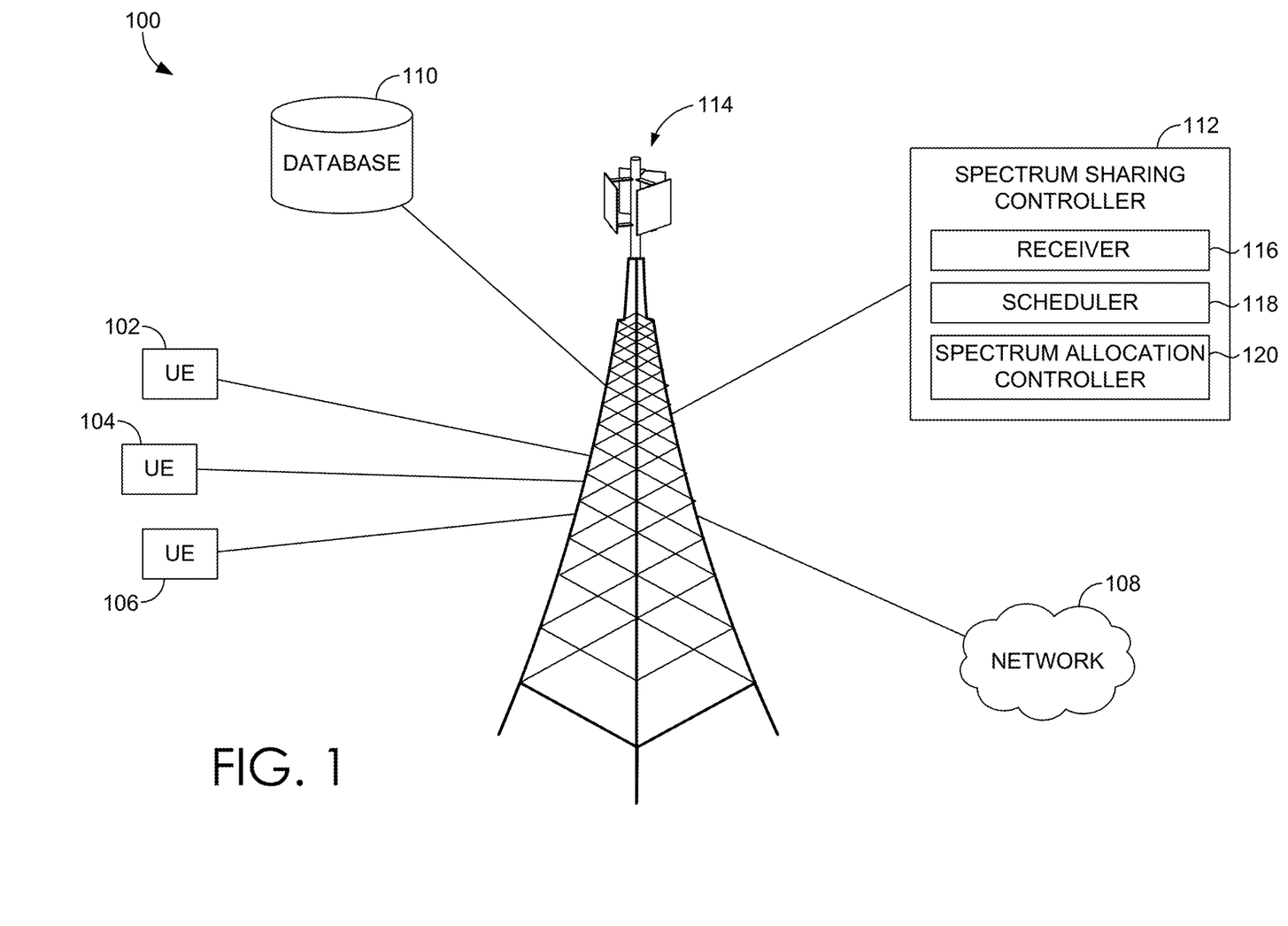
FIG. 1 depicts an exemplary network environment in which implementations of the present disclosure may be employed.

Turning now to FIG. 1, network environment 100 is an exemplary network environment in which implementations of the present disclosure may be employed. Network environment 100 is one example of a suitable network environment and is not intended to suggest any limitation as to the scope of use or functionality of the present disclosure. Neither should the network environment be interpreted as having any dependency or requirement relating to any one or combination of components illustrated.

The network environment 100 of FIG. 1 includes user devices 102, 104, and 106, a cell site 114, a network 108, a database 110, and a spectrum sharing controller 112. In the network environment 100, the user devices 102, 104, and 106 may take on a variety of form, such as a PC, a user device, a smart phone, a smart watch, an IoT device, a laptop computer, a mobile phone, a mobile device, a tablet computer, a gaming device, a wearable computer, a PDA, a server, a CD player, an MP3 player, GPS device, a video player, a handheld communications device, a workstation, a router, an access point, and any combination of these delineated devices, or any other device that communicates via wireless communications with a cell site 114 in order to interact with network 108, which may be a public or a private network.

In some aspects, the user devices 102, 104, and 106 corresponds to a user device or a computing device. For example, the user device may include a display(s), a power source(s) (e.g., a battery), a data store(s), a speaker(s), memory, a buffer(s), a radio(s), and the like. In some implementations, the user devices 102, 104, and 106 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, 6G, LTE, CDMA, WiMAX or any other type of network.

In some cases, the user devices 102, 104, and 106 in network environment 100 may optionally utilize network 108 to communicate with other computing devices (e.g., a mobile device(s), a server(s), a personal computer(s), etc.) through cell site 114. The network 108 may be a telecommunications network(s), or a portion thereof. A telecommunications network might include an array of devices or components (e.g., one or more base stations), some of which are not shown. Those devices or components may form network environments similar to what is shown in FIG. 1 and may also perform methods in accordance with the present disclosure. Components such as terminals, links, and nodes (as well as other components) may provide connectivity in various implementations. Network 108 may include multiple networks, as well as being a network of networks, but is shown in more simple form so as to not obscure other aspects of the present disclosure.

Network 108 may be part of a telecommunication network that connects subscribers to their service provider. In aspects, the service provider may be a telecommunications service provider, an internet service provider, or any other similar service provider that provides at least one of voice telecommunications and/or data services to user devices 102, 104, and 106 and any other UEs. For example, network 108 may be associated with a telecommunications provider that provides services (e.g., LTE, 5G, 6G) to the user devices 102, 104, and 106. Additionally or alternatively, network 108 may provide voice, SMS, and/or data services to user devices or corresponding users that are registered or subscribed to utilize the services provided by a telecommunications provider. Network 108 may comprise any communication network providing voice, SMS, and/or data service (s), using any one or more wireless communication protocols, such as a 1× circuit voice, a 3G network (e.g., CDMA, CDMA2000, WCDMA, GSM, UMTS), a 4G network (WiMAX, LTE, HSDPA), a 5G (5G NR) network, or a 6G network. The network 108 may also be, in whole or in part, or have characteristics of, a self-optimizing network.

In some implementations, cell site 114 is configured to communicate with the user devices 102, 104, and 106 that are located within the geographical area defined by a transmission range and/or receiving range of the radio antennas of cell site 114. The geographical area may be referred to as the "coverage area" or "coverage footprint" of the cell site or simply the "cell," as used interchangeably hereinafter. Cell site 114 may include one or more base stations, base transmitter stations, radios, antennas, antenna arrays, power amplifiers, transmitters/receivers, digital signal processors, control electronics, GPS equipment, and the like. In particular, cell site 114 may be configured to wirelessly communicate with devices within a defined and limited geographical area. For the purposes of the present disclosure, it may be assumed that it is undesirable and unintended by the network 108 that the cell site 114 provide wireless connectivity to the user devices 102, 104, and 106 when the user devices 102, 104, and 106 are geographically situated outside of the cell associated with the cell site 114.

In an exemplary aspect, the cell site 114 comprises a base station that serves at least one sector of the cell associated with the cell site 114 and at least one transmit antenna for propagating a signal from the base station to one or more of the user devices 102, 104, and 106. In other aspects, the cell site 114 may comprise multiple base stations and/or multiple transmit antennas for each of the one or more base stations, any one or more of which may serve at least a portion of the cell. In some aspects, the cell site 114 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more as measured at ground level and extending outward from an antenna at the cell site. In another example, a small cell may correspond to a coverage area having a radius of approximately less than three miles as measured at ground level and extending outward from an antenna at the cell site.

As shown, cell site 114 is in communication with the spectrum sharing controller 112, which comprises various components that are utilized, in various implementations, to perform one or more methods for scheduling, allocating, and balancing the allocation of resources associated with a shared communication spectrum (e.g., a range of electromagnetic frequencies shared by two or more communication technologies) associated with the network 108. In aspects, spectrum sharing controller 112 may comprise a receiver 116, a scheduler 118, and a spectrum allocation controller 120. However, in some embodiments, other components than those shown in FIG. 1 may be utilized to carry out aspects of the systems and methods described herein. Each of the components or sub components of the spectrum sharing controller 112 may be a stand-alone or combined processor, server, or other computer processing component that is suitably configured to perform the operations described herein.

In various aspects, the receiver 116 of the spectrum sharing controller 112 is generally responsible for receiving information associated with one or more user devices, e.g., the user devices 102, 104, and/or 106. In aspects, the receiver 116 may receive a message or transmission comprising information associated with one or more user devices. In aspects, the receiver 116 may receive information associated with one or more user devices that may be information that is relevant for configuring one or more base stations and/or user devices for communication using a shared communication spectrum. For instance, in certain aspects, the information associated with one or more user devices may be used to schedule, assign, or otherwise allocation spectrum resources of the network 108 to the one or more user devices. The spectrum resources may be allocated and/or divided among the user devices according to frequency (e.g., assigning particular carrier/sub-carrier frequencies) and/or according to time (e.g., assigning particular time slots). In some embodiments, a combination of time and frequency division and/or multiplexing may be employed to allocate spectrum resources. In some embodiments, information received by the receiver 116 may be stored in one or more data stores such a database 110.

In some embodiments, the receiver 116 may receive information generated by the user device which may include a measurement report indicating various measurements of the device such as one or more signal quality measurements and/or other indications of RF conditions. As an example, references signals may be used to estimate communication signal power, tracking transmitter phase, channel sounding, or any of a number of communication operations. In some aspects, a reference signal may comprise DMRS, PT-RS, CSI-RS, SRS, or a combination thereof. In certain aspects, the information associated with one or more user devices can include signal quality information associated with one or more user devices. Signal quality information may comprise any value, measure, or indication of signal attributes (e.g., power, noise, quality, signal strength). Signal quality information may comprise measurements such as SINR, RSRP, RSRQ, RSSI, or a combination thereof. In some other embodiments, the receiver 116 may receive one or more RRC signals from one or more user devices or components associated with cell site 114 and/or network 108. For example, the receiver 116 may receive RRC signals indicating system information, handover signals, measurement reporting, and other signals association with radio resource management. In some embodiments, the receiver 116 may receive information associated with one or more qualities of service ("QoS") attributes associated with one or more user devices.

In aspects, the scheduler 118 utilizes and/or analyzes the information received from the receiver 116 to determine a spectrum allocation configuration. The spectrum allocation configuration defines a division of spectrum resources (e.g., spectrum resource blocks) in a shared communication spectrum among one or more communication devices (e.g., user equipment) that communicate, or otherwise operate, within the spectrum. For example, the scheduler 118 may allocate particular frequencies or time slots between devices such as user devices 102, 104, and 106. The scheduler 118 can allocate spectrum resources or availability according to a frequency division and/or a time division. As an example, the scheduler 118 may determine a spectrum allocation configuration that allocates a particular frequency to a first user device at a first time and the same frequency to a second user device at a second time. As a further example, the scheduler 116 may determine a spectrum allocation configuration that allocates a first frequency to a first user device and simultaneously allocates a second frequency to a second user device.

The scheduler 118 may use information received from the receiver 116 to determine a spectrum allocation configuration. For example, the scheduler 118 may use the information received from the user devices 102, 104, and 106 to allocation spectrum resources between the user devices. In some embodiments, the scheduler 118 may allocation spectrum resources between devices which operation according to various communication technologies. For example, the scheduler 118, may determine a spectrum allocation configuration that defines divisions of a spectrum between 5G devices and 6G devices. In some embodiments, the scheduler 118 may be configured to determine that a device should be transferred between operations according to a plurality of communication technologies. For example, based on communication needs of a particular user device, the scheduler 118 may determine to move the user device from operating according to a 5G technology to a 6G technology. In some embodiments, the scheduler 118 may be configured to allocate spectrum resources across any number of frequency bands. For example, the scheduler 118 may allocate spectrum resources comprised in the frequency bands comprised in the 5G NR Frequency Range 1 ("FR1") and/or the 5G NR Frequency Range 2 ("FR2"). In embodiments, the scheduler 118 may determine a spectrum allocation configuration for frequency bands that operate according to one or more duplex modes (e.g., FDD, TDD, SDL, SUL, etc.) and/or for use in uplink or downlink transmissions.

In some embodiments, the scheduler 118 may be configured to determine a spectrum allocation configuration which uses a mixed subcarrier spacing to allocate spectrum resources between 5G and 6G devices. For example, the scheduler 118 may determine a spectrum allocation configuration that allocates spectrum to accommodate multiple subcarrier spacing sizes (e.g., 1.25, 5, 15, 30, 60, 120, and 240 KHz, etc.). In some embodiments, the scheduler 118 may be configured to determine a spectrum allocation configuration which uses mixed bandwidths to allocate spectrum resources between 5G and 6G devices user devices. For example, the scheduler 118 may determine a spectrum allocation configuration allocating spectrum resources to a 5G device using a first bandwidth size and a 6G device using a second bandwidth size.

In aspects, once the scheduler 118 has determined a spectrum allocation configuration using, in part, the information received by the receiver 116, the spectrum allocation controller 120 may cause modification to the configuration of the network to update the network according to the determined spectrum allocation configuration. For example, based on the spectrum allocation configuration determined by the scheduler 118, the spectrum allocation controller 120 may cause control signals to be transmitted to the user devices 102, 104, and 106, causing the user devices to operate according to the spectrum allocation configuration. In some embodiments, the spectrum allocation configuration may be stored in a data store such as database 110. In at least one embodiments, the spectrum allocation controller 120 may cause a portion of the spectrum allocation configuration to be transmitted to a user device. For example, only the portions of a spectrum allocation configuration relevant to a particular device may be transmitted to that device.

In some embodiments, information associated with the determined spectrum allocation configuration may be transmitted to the user devices 102, 104, and 106, from the cell site 114 using one or more control channels, such as a downlink control information ("DCI") signals that may correspond to physical downlink shared control channel ("PDSCH"), physical uplink shared channel ("PUSCH"), physical downlink control channel ("PDCCH"), and/or physical uplink control channel ("PUCCH") signals.

Although in some embodiments, information relating to the adjustment of the allocation of shared spectrum resources may be transmitted to a user device, in the same or other aspects, the spectrum allocation controller 120 may be used by the cell site 114 to facilitate transmission operations with one or more user devices such as UE devices 102, 104, and 106.

Figure 2:
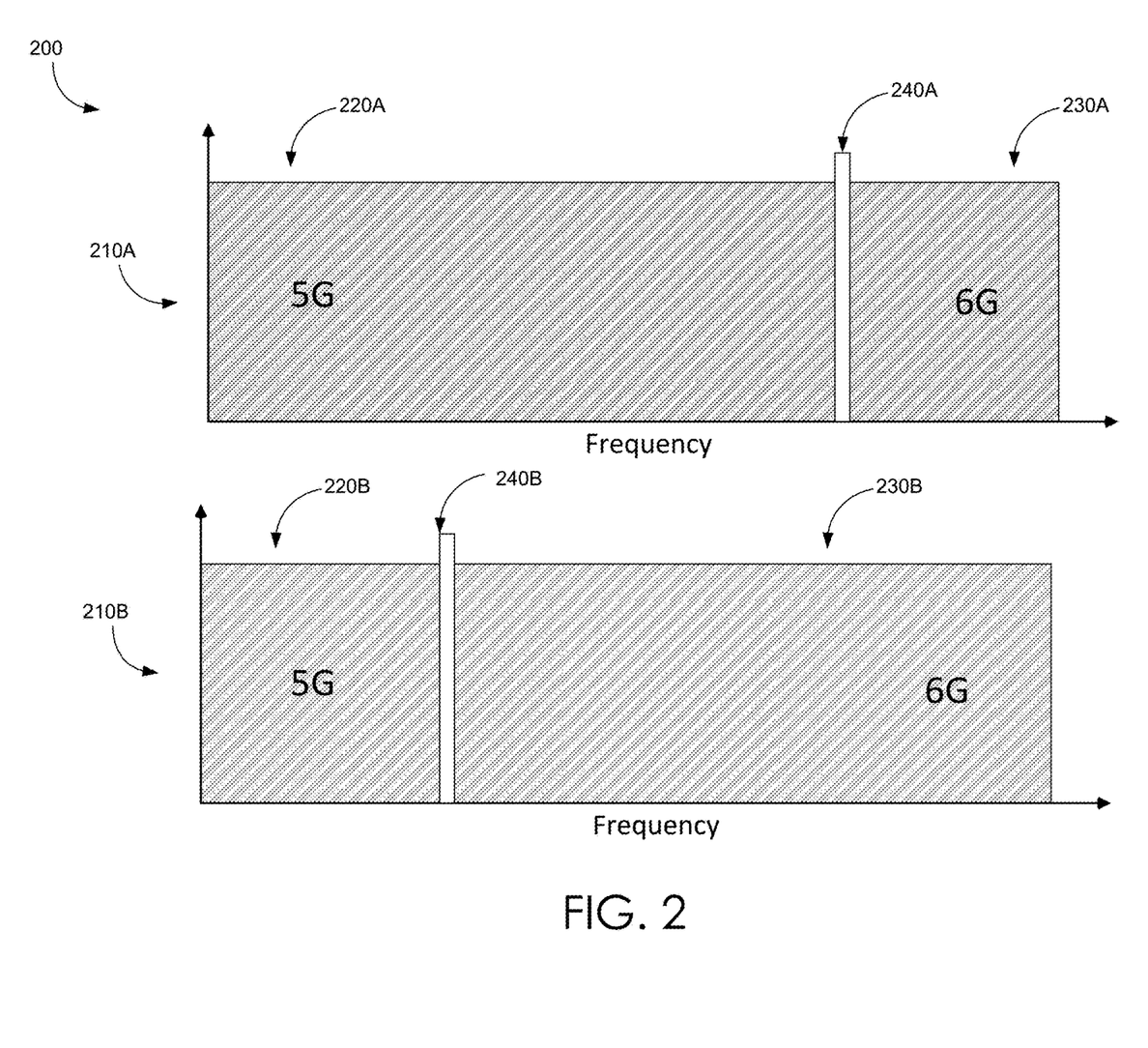
FIG. 2 depicts an example depiction of a shared communication spectrum, in accordance with aspects of the present disclosure.

FIG. 2 depicts an example depiction of a shared communication spectrum in accordance with the aspects of the present disclosure and is designated generally as spectrum 200. Spectrum 200 is but one example of a suitable configuration and is not intended to suggest any limitations as to the scope of use or functionality of embodiments described herein. Spectrum 200 is depicted in FIG. 2, at two different instances of time. Spectrum 210A depicts the shared spectrum at a first time and Spectrum 210B depicts the same shared spectrum at a second time.

Spectrum 200 comprises at least a first portion of the spectrum that is allocated, or otherwise associated with a first technology. For example, 5G frequency range 220A associated with spectrum 210A and 5G frequency range 220B associated with spectrum 210B. Spectrum 200 may comprised a second portion of the spectrum that is allocated, or otherwise associated, with a second technology different from the first technology. For example, 6G frequency range 230A associated with spectrum 210A and 6G frequency range 230B associated with spectrum 210B. In some embodiments, the portions of the spectrum allocated to the first technology and the second technology may be divided according to a gap divider, such as gap dividers 240A and 240B associated with spectrum 210A and spectrum 210B respectively. The gap dividers may serve to indicate the separation of the frequencies allocated to the first technology and the second technology. In some embodiments, spectrum 200 comprise division between the first technology (e.g., 5G) and the second technology (e.g., 6G) without the use of a gap divider.

In some embodiments, as a spectrum allocation configuration is updated, such as by the scheduler 118 of FIG. 1, the size and/or frequencies of the spectrum 100 allocated to each respective technology may be modified. For example, the 5G frequency range 220A is larger than the 6G frequency range 230A in spectrum 210A at a first time. In such an example, as the spectrum allocation configuration is updated at a second time, the spectrum 210A is reallocated to reflect the larger 6G frequency range 230B and smaller 5G frequency range 220B, associated with the spectrum 210B.

Thus, is some examples, the division of the spectrum 100 can be modified, updated, and/or re-defined based on a changing spectrum allocation configuration.

Figure 3:
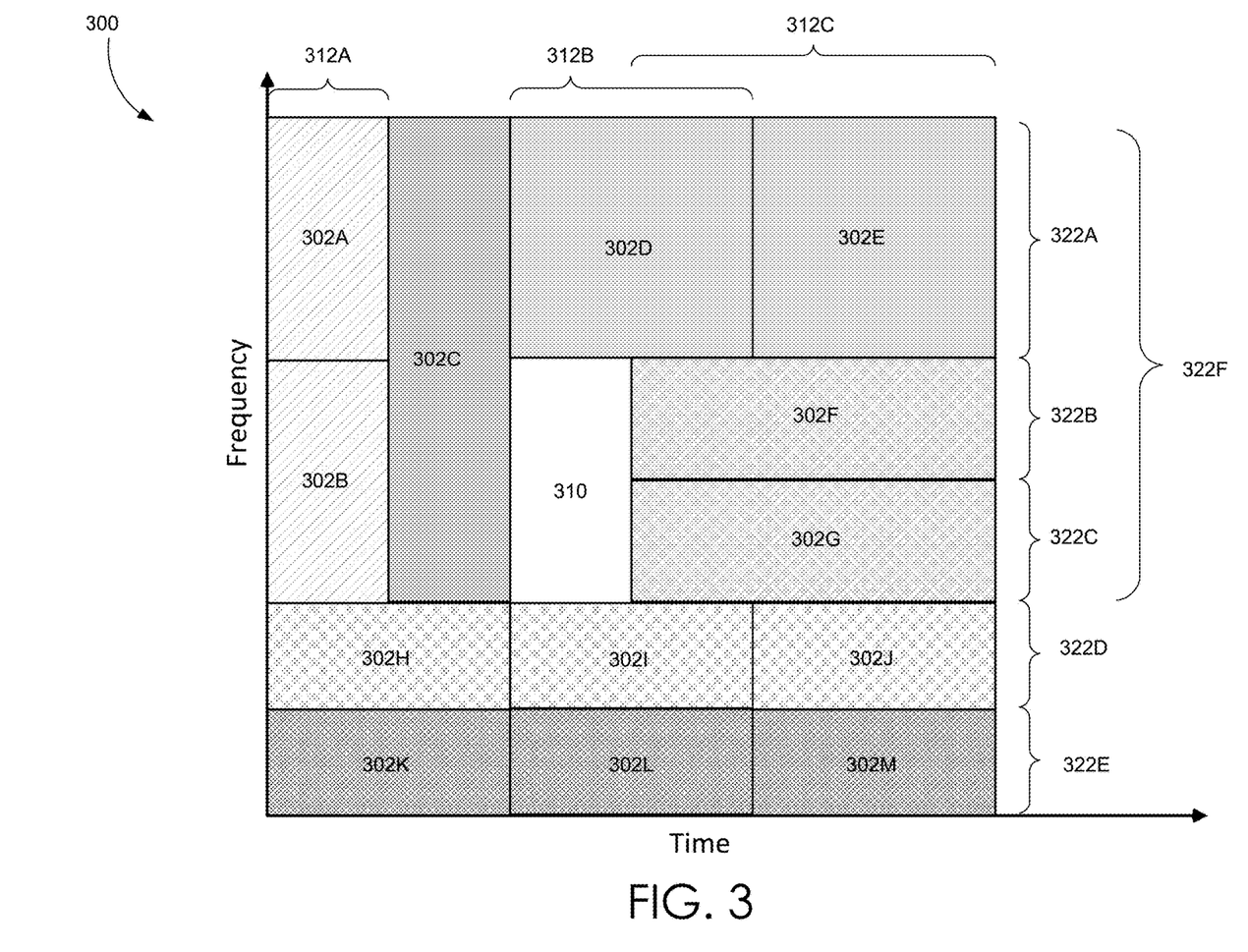
FIG. 3 depicts an example spectrum allocation, in accordance with aspects of the present disclosure.

FIG. 3 depicts an example spectrum allocation 300, in accordance with aspects of the present disclosure. In the aspect depicted in FIG. 3, spectrum resource blocks 302A-M are allocated in a spectrum with respect to a frequency domain and a time domain. The spectrum resource blocks 302A-M may be allocated to a particular frequency according to a particular subcarrier spacing associated with the frequency and/or the resource blocks. For example, the subcarrier spacing frequencies 322A, 322B, 322C, 322D, 322E, and 322F are associated with resource blocks 302A, 302B, 302D, 302E; 302F; 302G; 302H, 302I, 302J; and 302K, 302L, 302M respectively. In some embodiments, the spectrum resource blocks 302A-M may be associated with various lengths of time in the time domain. For example spectrum resource blocks 302A, 302B, and 302C may occupy a time span 312A while spectrum resource blocks 302D, 302E, and 302H-302M may be allocated a time span 312B. Similarly, in this example, spectrum resource blocks 302F and 302G may be allocated to a time span 312C.

In some embodiments, where a spectrum resource block cannot be allocated, an empty block 310 or gap band may be placed in the spectrum allocation until the frequency or time slot can be filled with a spectrum resource block.

Figure 4:
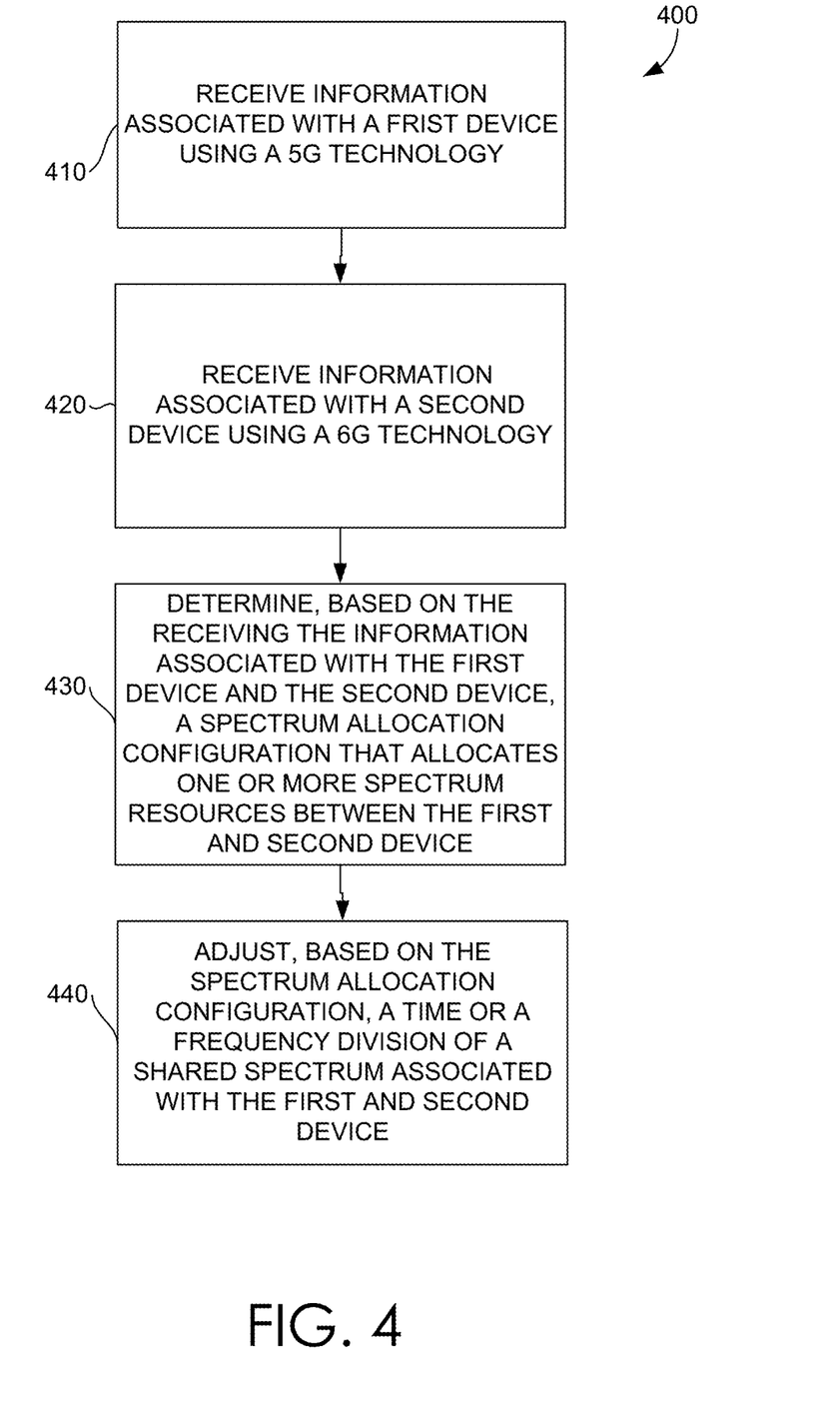
FIG. 4 depicts a flow chart of a method for spectrum resource allocation, in accordance with aspects of the present disclosure.
Figure 5:
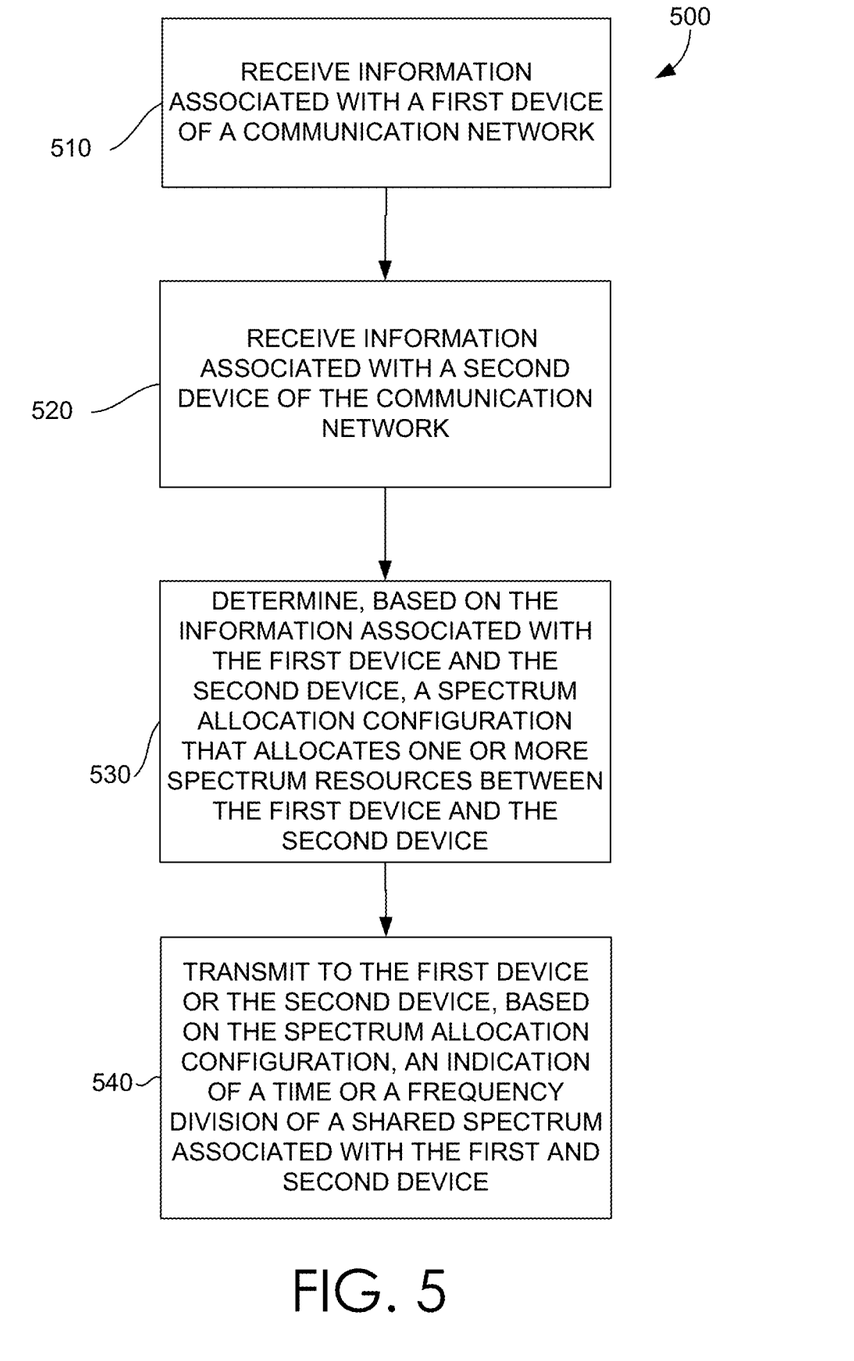
FIG. 5 depicts a flow chart of a method for shared spectrum allocation in communication systems, in accordance with aspects of the present disclosure.
Figure 6:
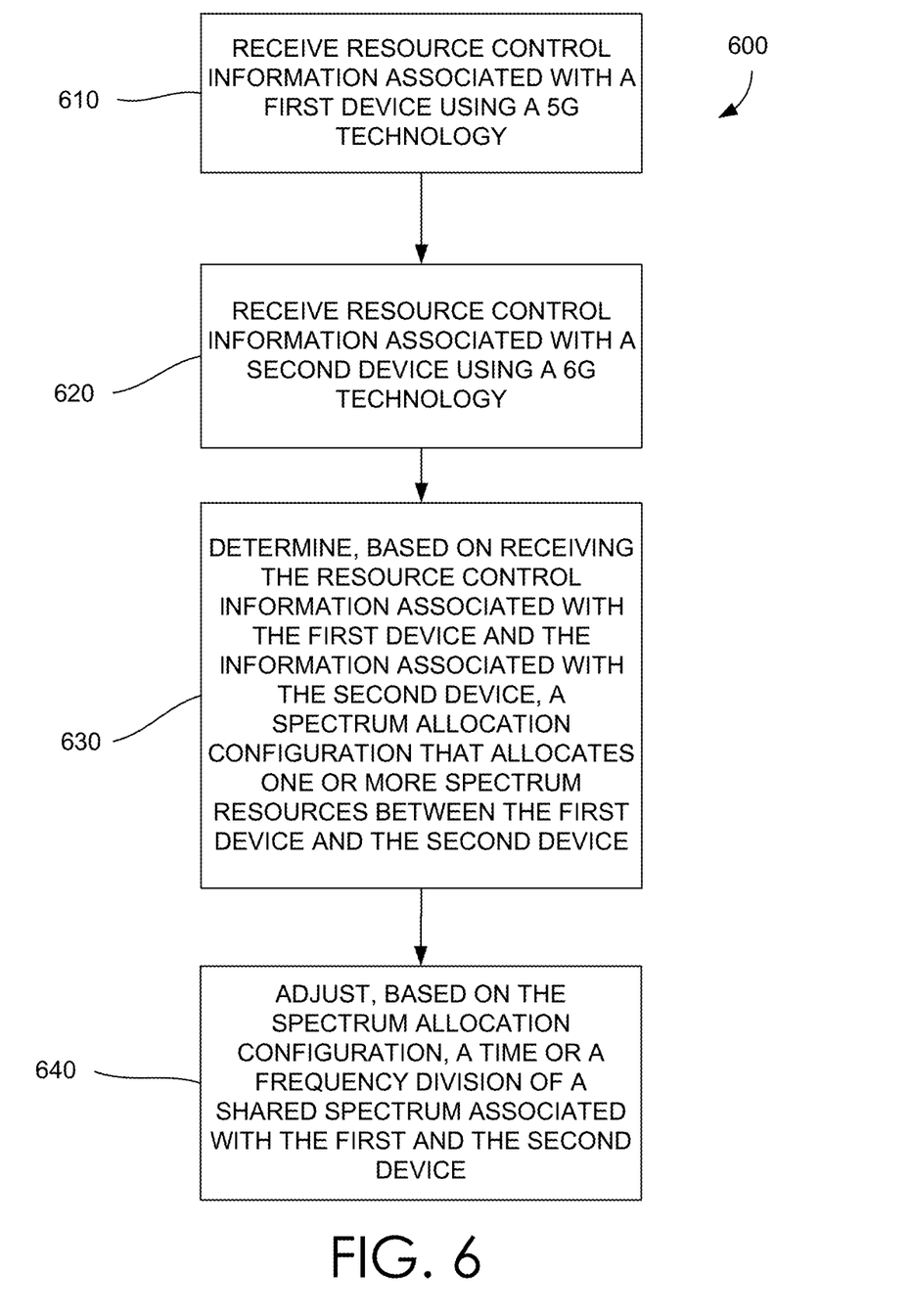
FIG. 6 depicts a flow chart of a method for shared spectrum configuration in communication systems, in accordance with aspects of the present disclosure.

Now referring to FIGS. 4-6, each block of methods 400, 500, and 600, described herein, comprises a computing process that may be performed using any combination of hardware, firmware, and/or software. For instance, various functions may be carried out by a processor executing instructions stored in memory. The methods 400, 500, and 600 may also be embodied as computer-usable instructions stored on computer storage media. The methods 400, 500, and 600 may be provided by a standalone application, a service or hosted service (standalone or in combination with another hosted service), or a plug-in to another product, to name a few. In addition, the methods 400, 500, and 600 are described, by way of example, with respect to the system of FIG. 1. However, these methods may additionally or alternatively be executed by any one system, or any combination of systems, including, but not limited to, those described herein.

FIG. 4 is a flow chart illustrating an example method 400 for spectrum resource allocation in accordance with aspects of the present disclosure. It should be understood that while FIG. 4 depicts just one particular arrangement and/or order of steps, other arrangements and/or orders of steps are possible and contemplated by the disclosed herein. For instance, one or more of the steps depicted in FIG. 4, may be performed in a different order or otherwise omitted.

At step 410 of the method 400, information associated with a first device using a 5G technology may be received, for example, by the receiver 116 of FIG. 1. For example, The receiver 116 may receive information, from one or more UE(s) 102, 104, or 106. For instance, a user device may transmit, over the network 108, a RRC, SINR, and/or CSI-RS information that is received with the receiver 116.

At step 420 of the method 400, information associated with a second device using a 6G technology may be received, for example, by the receiver 116 of FIG. 1. For example, The receiver 116 may receive information, from one or more UE(s) 102, 104, or 106. For instance, a user device may transmit, over the network 108, a RRC, SINR, and/or CSI-RS information that is received with the receiver 116.

At step 430 of the method 400, a spectrum allocation configuration that allocates on or more spectrum resources between the first and second device may be determined based on receiving information associated with the first device and the second device. For example, the scheduler 118 of FIG. 1 may perform load-balancing operations to allocate spectrum resources among a multitude of devices, such as user devices 102, 104, and 106. In at least one embodiment, the spectrum allocation configuration is determined using a neural network and/or machine learning model trained to perform load-balancing operations on a shared spectrum.

At step 440 of the method 400, a time division and/or a frequency division of a shared spectrum associated with the first device and the second device is adjusted. In some embodiments, the adjustment to the time division and/or the frequency division may be based on the spectrum allocation configuration. For example, the spectrum allocation controller 120 of FIG. 1 may use a spectrum allocation configuration determined by the scheduler 118 to cause one or more of the user devices 102, 104, and 106 to operate according to spectrum allocation configuration. In some embodiments, the spectrum allocation configuration may cause control signals to be transmitted to devices operation on a communication network, indicating to the devices to make adjustments based on the spectrum allocation configuration FIG. 5 is a flow chart illustrating an example method 500 for shared spectrum allocation in communication systems, in accordance with aspects of the present disclosure. It should be understood that while FIG. 5 depicts just one particular arrangement and/or order of steps, other arrangements and/or orders of steps are possible and contemplated by the disclosed herein. For instance, one or more of the steps depicted in FIG. 5, may be performed in a different order or otherwise omitted.

At step 510 of the method 500, information associated with a first device of a communication network is received. For example, receiver 116 of FIG. 1 may receive information, from one or more UE(s) 102, 104, or 106. For instance, a user device may transmit, over the network 108, a RRC, SINR, CSI-RS, and/or other information that is received with by receiver 116.

At step 520 of the method 500, information associated with a second device of a communication network is received. For example, receiver 116 of FIG. 1 may receive information, from one or more UE(s) 102, 104, or 106. For instance, a user device may transmit, over the network 108, a RRC, SINR, CSI-RS, and/or other information that is received with by receiver 116.

At step 530 of the method 500, a spectrum allocation configuration that allocates on or more spectrum resources between the first and second device may be determined based on receiving information associated with the first device and the second device. For example, the scheduler 118 of FIG. 1 may perform load-balancing operations to allocate spectrum resources among a multitude of devices, such as user devices 102, 104, and 106. In at least one embodiment, the spectrum allocation configuration is determined using a neural network and/or machine learning model trained to perform load-balancing operations on a shared spectrum.

At step 540 of the method 500, a time division and/or a frequency division of a shared spectrum associated with the first device and the second device is transmitted to the first device or the second device. In some embodiments, the adjustment to the time division and/or the frequency division may be based on the spectrum allocation configuration. For example, the spectrum allocation controller 120 of FIG. 1 may transmit the spectrum allocation configuration determined by the scheduler 118 to one or more of the user devices 102, 104, and 106 to cause one or more of the user devices 102, 104, and 106 to operate according to spectrum allocation configuration. In some embodiments, the spectrum allocation configuration may cause control signals to be transmitted to devices operation on a communication network, indicating to the devices to make adjustments based on the spectrum allocation configuration FIG. 6 is a flow chart illustrating an example method 600 for shared spectrum configuration in communication systems, in accordance with aspects of the present disclosure. It should be understood that while FIG. 6 depicts just one particular arrangement and/or order of steps, other arrangements and/or orders of steps are possible and contemplated by the disclosed herein. For instance, one or more of the steps depicted in FIG. 6, may be performed in a different order or otherwise omitted.

At step 610 of the method 600, information associated with a first device using a 5G technology may be received, for example, by the receiver 116 of FIG. 1. For example, The receiver 116 may receive information, from one or more UE(s) 102, 104, or 106. For instance, a user device may transmit, over the network 108, a RRC, SINR, QoS, and/or CSI-RS information that is received with the receiver 116.

At step 620 of the method 600, information associated with a second device using a 6G technology may be received, for example, by the receiver 116 of FIG. 1. For example, The receiver 116 may receive information, from one or more UE(s) 102, 104, or 106. For instance, a user device may transmit, over the network 108, a RRC, SINR, QoS, and/or CSI-RS information that is received with the receiver 116.

At step 630 of the method 600, a spectrum allocation configuration that allocates on or more spectrum resources between the first and second device may be determined based on receiving information associated with the first device and the second device. For example, the scheduler 118 of FIG. 1 may perform load-balancing operations to allocate spectrum resources among a multitude of devices, such as user devices 102, 104, and 106. In at least one embodiment, the spectrum allocation configuration is determined using a neural network and/or machine learning model trained to perform load-balancing and scheduling operations on a shared spectrum.

At step 640 of the method 600, a time division and/or a frequency division of a shared spectrum associated with the first device and the second device is adjusted. In some embodiments, the adjustment to the time division and/or the frequency division may be based on the spectrum allocation configuration. For example, the spectrum allocation controller 120 of FIG. 1 may use a spectrum allocation configuration determined by the scheduler 118 to cause one or more of the user devices 102, 104, and 106 to operate according to spectrum allocation configuration. In some embodiments, the spectrum allocation configuration may cause control signals to be transmitted to devices operation on a communication network, indicating to the devices to make adjustments based on the spectrum allocation configuration.

Figure 7:
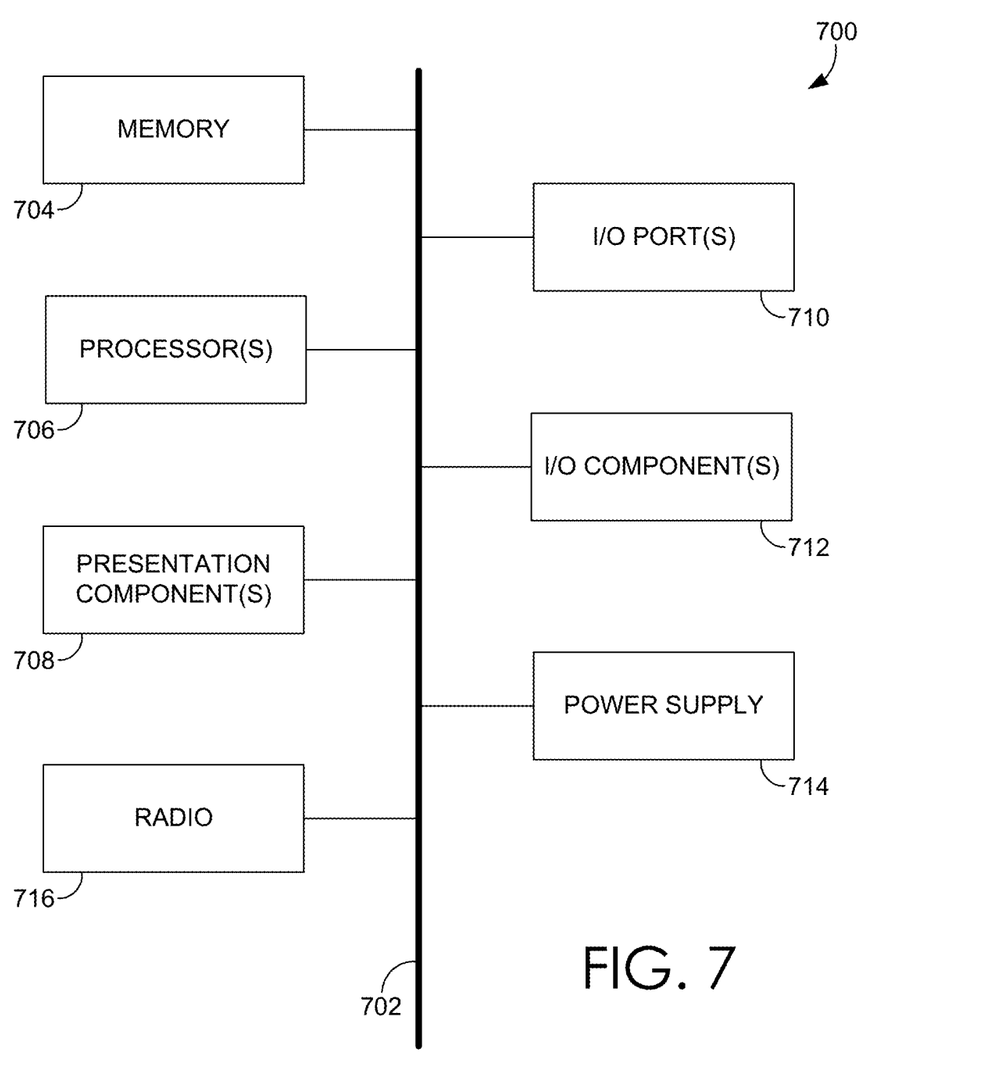
FIG. 7 depicts a diagram of an exemplary computing environment suitable for use in implementations of the present disclosure.

Referring now to FIG. 7, a diagram is depicted of an exemplary computing environment suitable for use in implementations of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 7, computing device 700 includes bus 702 that directly or indirectly couples the following devices: memory 704, one or more processors 706, one or more presentation components 708, input/output (I/O) ports 710, I/O components 712, power supply 714 and radio(s) 716. Bus 702 represents what may be one or more busses (such as an address bus, data bus, or combination thereof). Although the devices of FIG. 7 are shown with lines for the sake of clarity, in reality, delineating various components is not so clear, and metaphorically, the lines would more accurately be grey and fuzzy. For example, one may consider a presentation component, such as a display device to be one of I/O components 712. Also, processors, such as one or more processors 706, have memory. The present disclosure hereof recognizes that such is the nature of the art, and reiterates that FIG. 7 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 7 and refer to "computer" or "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data.

Computer storage media includes RAM, ROM, EEPROM, flash memory or other memory technology, CD-ROM, DVD or other optical disk storage, magnetic cassettes, magnetic tape, magnetic disk storage, or other magnetic storage devices. Computer storage media does not comprise a propagated data signal.

Communication media typically embodies computer-readable instructions, data structures, program modules, or other data in a modulated data signal, such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media such as acoustic, RF, infrared, and other wireless media. Combinations of any of the above should also be included within the scope of computer-readable media.

Memory 704 includes computer-storage media in the form of volatile and/or nonvolatile memory. Memory 704 may be removable, non-removable, or a combination thereof. Exemplary memory includes solid-state memory, hard drives, optical-disc drives, etc. Computing device 700 includes one or more processors 706 that read data from various entities, such as bus 702, memory 704, or I/O components 712. One or more presentation components 708 presents data indications to a person or other device. Exemplary one or more presentation components 708 include a display device, speaker, printing component, vibrating component, etc. I/O ports 710 allow computing device 700 to be logically coupled to other devices, including I/O components 712, some of which may be built in computing device 700. Illustrative I/O components 712 include a microphone, joystick, game pad, satellite dish, scanner, printer, wireless device, etc.

Radio(s) 716 represents a radio that facilitates communication with a wireless telecommunications network. Illustrative wireless telecommunications technologies include CDMA, GPRS, TDMA, GSM, and the like. Radio 716 might additionally or alternatively facilitate other types of wireless communications including Wi-Fi, WiMAX, LTE, or other VoIP communications. As can be appreciated, in various embodiments, radio 716 can be configured to support multiple technologies and/or multiple radios can be utilized to support multiple technologies. A wireless telecommunications network might include an array of devices, which are not shown so as to not obscure more relevant aspects of the invention. Components, such as a base station, a communications tower, or even access points (as well as other components), can provide wireless connectivity in some embodiments.

Many different arrangements of the various components depicted, as well as components not shown, are possible without departing from the scope of the claims below. Embodiments of this technology have been described with the intent to be illustrative rather than be restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A method for allocating resources in a shared spectrum, the method comprising:
receiving information associated with a first device using a 5G technology;
receiving information associated with a second device using a 6G technology;
determining, based on receiving the information associated with the first device and the information associated with the second device, a spectrum allocation configuration that allocates one or more spectrum resources between the first device and the second device; and
adjusting, based on the spectrum allocation configuration, a time or a frequency division of a shared spectrum associated with the first and the second device,
wherein the time or the frequency division of the shared spectrum is adjusted without determining a gap band between the resources allocated to the first device and the second device.

2. The method of claim 1, wherein the shared spectrum comprises one or more frequency bands selected from 5G NR Frequency Range 1 ("FR1"), from 450 MHz to 6,000 MHz, or 5G NR or Frequency Range 2 ("FR2"), from 24,250 MHz to 52,600 MHz.

3. The method of claim 1, wherein the spectrum allocation configuration allocates the one or more spectrum resources according to a time division duplex mode or a frequency division duplex mode.

4. The method of claim 1, wherein adjusting the time or frequency division of the shared spectrum comprises transmitting a control signal causing the first device or the second device to perform communication operations associated with the spectrum allocation configuration.

5. The method of claim 1, wherein the information associated with the first device or the second device indicates a quality of service associated with the first device or the second device.

6. The method of claim 1, wherein the information associated with the first device or the second device indicates a signal quality selected from signal-to-noise ratio (SNR), reference signal received power (RSRP), reference signal received quality (RSRQ), or channel state information (CSI), and is used to determine the allocation in the spectrum allocation configuration.

7. The method of claim 1, wherein the spectrum allocation configuration indicates one or more carrier frequencies comprising a plurality of sidebands, each sideband of the plurality of sidebands having either a first subcarrier spacing or a second subcarrier spacing.

8. A system comprising:
one or more processors; and
one or more computer storage hardware devices storing computer-usable instructions that, when used by the one or more processors, cause the one or more processors to:
receive information associated with a first device of a communication network;
receive information associated with a second device of the communication network;
determine, based on the information associated with the first device and the information associated with the second device, a spectrum allocation configuration that allocates one or more spectrum resources between the first device and the second device; and
transmit to the first device or the second device, based on the spectrum allocation configuration, an indication of a time or a frequency division of a shared spectrum associated with the first and the second device,
wherein the time or the frequency division of the shared spectrum is adjusted without determining a gap band between the resources allocated to the first device and the second device.

9. The system of claim 8, wherein the first device is associated with a 5G technology and the second device is associated with a 6G technology.

10. The system of claim 8, wherein the shared spectrum comprises Frequency Range 1 ("FR1") of 5G NR or Frequency Range 2 ("FR2") of 5G NR.

11. The system of claim 8, wherein the spectrum allocation configuration allocates the one or more spectrum resources according to a time division duplex mode or a frequency division duplex mode.

12. The system of claim 8, wherein transmitting the indication of the time or frequency division of a shared spectrum comprises causes the first device or the second device to perform communication operations associated with the spectrum allocation configuration.

13. The system of claim 8, wherein the information associated with the first device or the second device indicates a quality of service associated with the first device or the second device.

14. The system of claim 8, wherein, the spectrum allocation configuration indicates one or more carrier frequencies comprising a plurality of sidebands, each sideband of the plurality of sidebands having either a first subcarrier spacing or a second subcarrier spacing.

15. One or more non-transitory computer-readable media having computer-executable instructions embodied thereon that, when executed by one or more processors, perform a method for adjusting time or frequency division of a shared spectrum, the method comprising:
    receiving resource control information associated with a first device using a 5G technology;
    receiving resource control information associated with a second device using a 6G technology;
    determining, based on receiving the resource control information associated with the first device and the information associated with the second device, a spectrum allocation configuration that allocates one or more spectrum resources between the first device and the second device; and
    adjusting, based on the spectrum allocation configuration, a time or a frequency division of a shared spectrum associated with the first and the second device,
    wherein the time or the frequency division of the shared spectrum is adjusted without determining or maintaining a gap band between the resources allocated to the first device and the second device.

16. The media of claim 15, wherein the shared spectrum comprises Frequency Range 1 ("FR1") of 5G NR or Frequency Range 2 ("FR2") of 5G NR.

17. The media of claim 15, wherein the spectrum allocation configuration allocates the one or more spectrum resources according to a time division duplex mode or a frequency division duplex mode.

18. The media of claim 15, wherein adjusting the time or frequency division of the shared spectrum comprises transmitting a control signal causing the first device or the second device to perform communication operations associated with the spectrum allocation configuration.

19. The media of claim 15, wherein the information associated with the first device or the second device indicates a quality of service associated with the first device or the second device.

* * * * *